No. 782,766. PATENTED FEB. 14, 1905.
E. D. STEGER.
MIXER AND FEEDER FOR USE IN BRICK MAKING.
APPLICATION FILED MAR. 9, 1904.

2 SHEETS—SHEET 1.

WITNESSES:

INVENTOR
Edward D. Steger
BY
ATTORNEY

No. 782,766. PATENTED FEB. 14, 1905.
E. D. STEGER.
MIXER AND FEEDER FOR USE IN BRICK MAKING.
APPLICATION FILED MAR. 9, 1904.

2 SHEETS—SHEET 2.

WITNESSES:
INVENTOR
Edward D. Steger
BY
James L. Norris
ATTORNEY

No. 782,766. Patented February 14, 1905.

UNITED STATES PATENT OFFICE.

EDWARD DARLING STEGER, OF BONHAM, TEXAS.

MIXER AND FEEDER FOR USE IN BRICK-MAKING.

SPECIFICATION forming part of Letters Patent No. 782,766, dated February 14, 1905.

Application filed March 9, 1904. Serial No. 197,252.

*To all whom it may concern:*

Be it known that I, EDWARD DARLING STEGER, a citizen of the United States, residing at Bonham, in the county of Fannin and State of Texas, have invented new and useful Improvements in Mixers and Feeders for Use in Brick-Making, of which the following is a specification.

This invention relates to a mixer and feeder for use in brick-making.

In the manufacture of a certain kind of brick I employ sand and lime. Before the several ingredients of the brick are subjected to the action of a press it is necessary that such lime and sand should be thoroughly mixed and that simultaneously the lime should be slaked. By virtue of my apparatus, one simple and convenient embodiment of which is illustrated in the accompanying drawings, forming a part of this specification, and which will be hereinafter explicitly described, I am enabled effectually and rapidly to accomplish the desired objects. I do not, of course, limit myself to the exact disclosure made by said drawings and description, for certain variations may be adopted within the scope of my claims succeeding such description.

Figure 1:
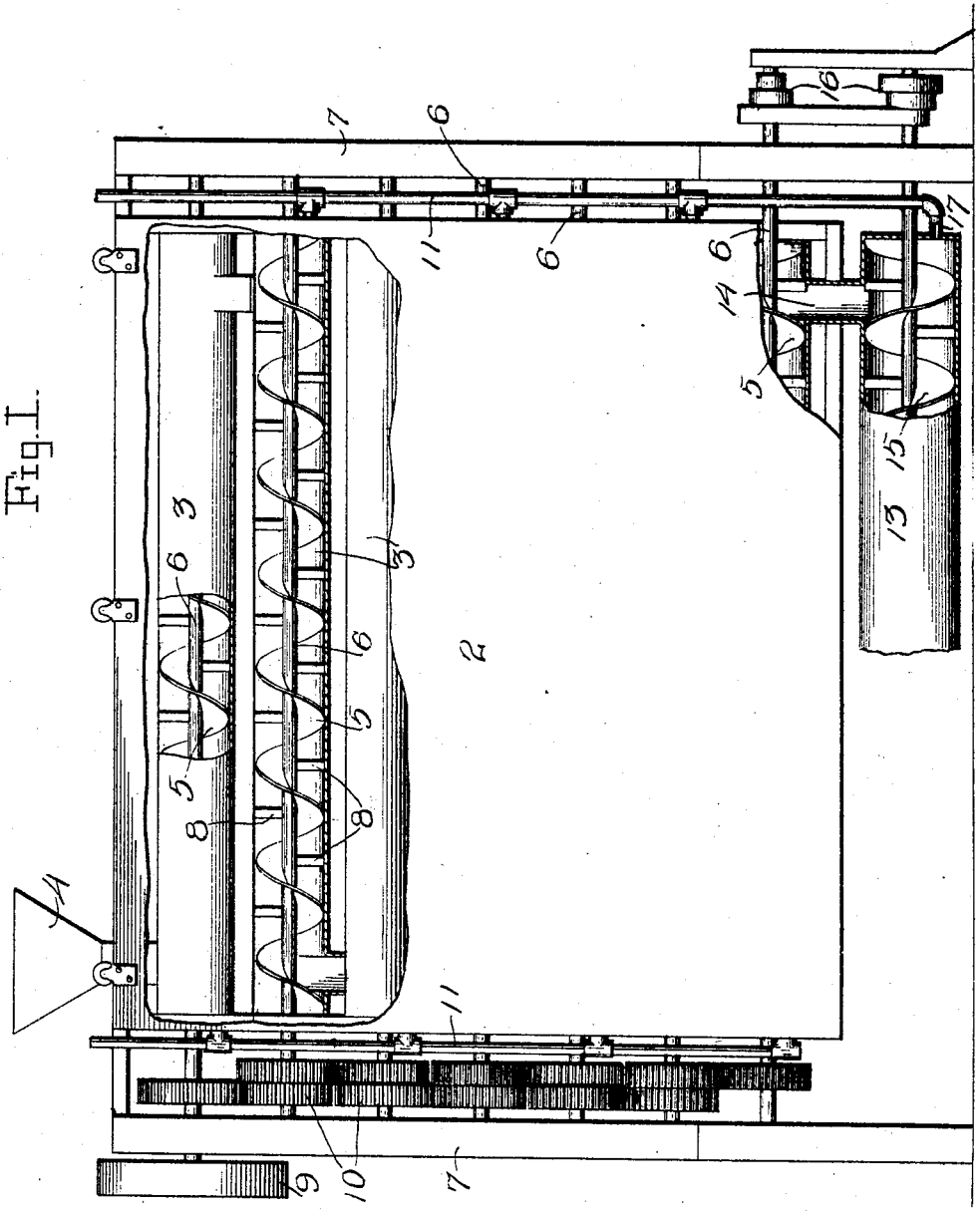
Figure 2:
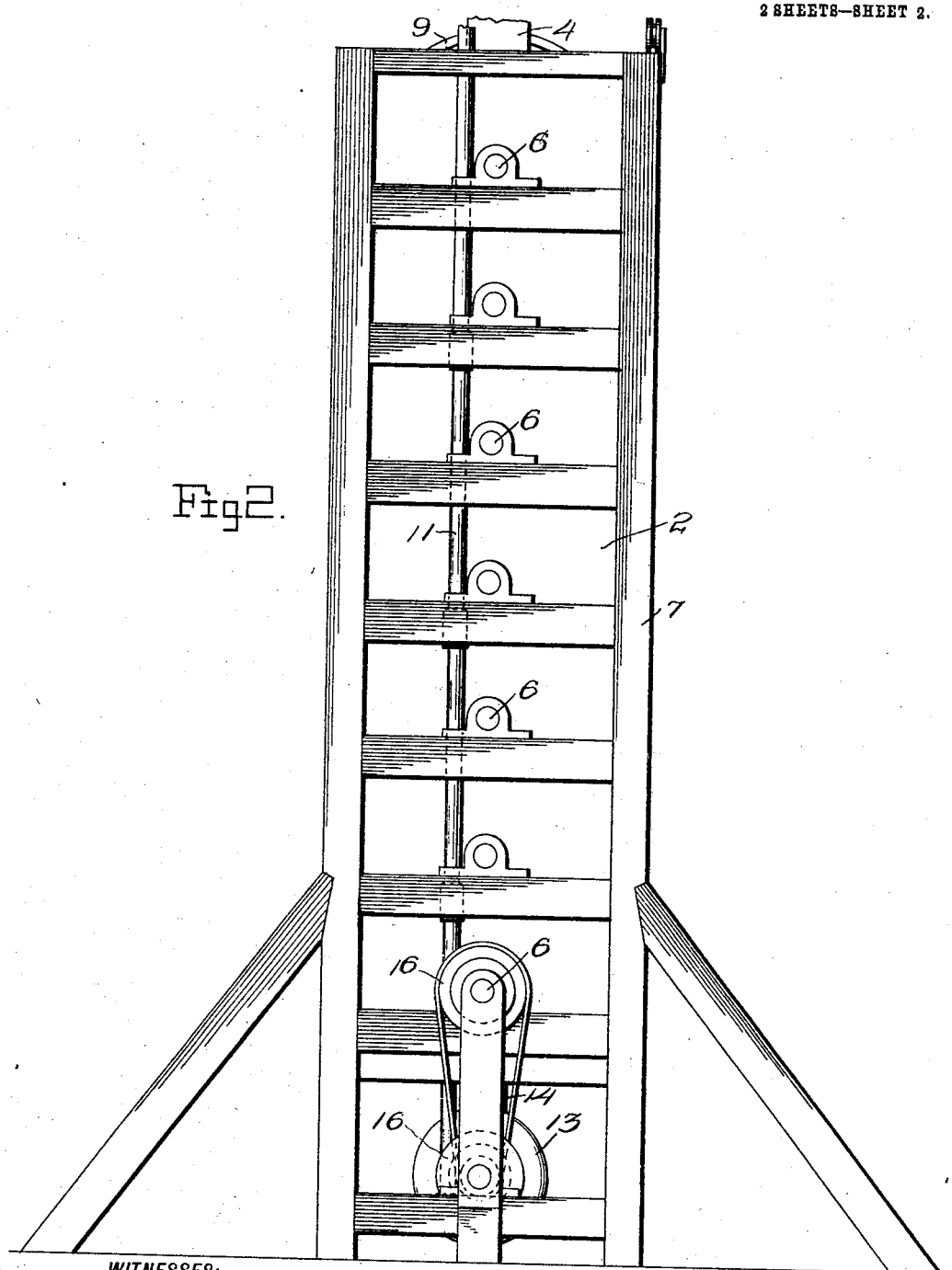

In the drawings, Figure 1 is a side elevation of an apparatus including my invention with portions thereof broken away. Fig. 2 is an elevation looking toward the right in Fig. 1 on an enlarged scale.

Like characters refer to like parts throughout both figures.

The apparatus includes in its construction a housing or casing, as 2, which may be made from wood or metal or of composite structure, as may be desired. This housing or casing is preferably steam-tight, or practically so. It incloses a plurality of troughs, as 3, disposed in superposed relation or one above the other. Seven of these troughs are shown, although this number may be increased or decreased, if desired. The topmost trough is adapted to deliver its contents into the trough next below, the same supplying to the second trough, and so on throughout the series. Mounted upon the top of the housing or casing at one end thereof is a hopper, as 4, into which granulated or pulverized lime and sand are suitably delivered. The top of the casing upon which the hopper is mounted has an opening registering with the outlet of the hopper, through which the said ingredients pass to be delivered into what might be considered the entering or receiving end of the initial or topmost trough 3. I have shown screw or spiral conveyers 5 mounted in the respective troughs for feeding the material therealong. The conveyers are so set that the upper one delivers its material toward the right and the next lower one toward the left, and so on in alternation throughout the series. The shafts 6 of the several conveyers extend through holes or perforations in the opposite ends of the casing, and the journal portions of said shafts are supported by frame members, as 7, suitably mounted outside of the casing, near the opposite ends thereof. In this way such journal portions are protected from the injurious action of flying particles in the casing and also from the action of steam or a hydrating agent that is introduced thereinto for the purpose of slaking the lime. The frame members 7 are in the shape of vertical columns or uprights, and they may be constructed in any desirable way.

While the conveyers 5 effectually mix the two substances hereinbefore mentioned, I do not wholly rely upon the same for this purpose, for I may provide the shafts of said conveyers with radial mixing or agitating blades, as 8. The blades 8, however, may be dispensed with. In fact, I do not limit myself to the use of a conveyer of the screw or spiral type, as a conveyer of a radically-different form may be substituted therefor and the same advantageous results secured. Each conveyer-trough has an outlet in its bottom at one end, the outlet of the uppermost trough being shown at the right thereof, while the outlet of the next trough is naturally at the left thereof. What might be considered the tail or delivery end of the uppermost trough delivers the mixed mass into the head end of the next lower trough, the same relation being followed out with the other and lower troughs.

The several conveyers are operated simultaneously preferably, and intermeshing gearing may be utilized for this purpose, or the same result can be accomplished in other ways. Ordinarily I prefer to drive the conveyers at progressively-increased speeds, the topmost one having the least velocity, whereby I am enabled to avoid to a large extent the choking or stoppage of the material in the lower troughs.

The topmost shaft 6 is shown as provided with a pulley or band wheel or equivalent power-driven member, as 9, adapted to be driven through belting or equivalent means from a suitable motor. (Not shown.) The several shafts are shown as connected by intermeshing gears, each denoted by 10, the topmost one being of greatest diameter and the diameters of the lower ones being progressively decreased, whereby the differential speed hereinbefore set forth can be obtained. The driving of the conveyers and the movement thereof at different ratios can be obtained, however, in other ways.

When the lime and sand are traversing the several troughs, the same are in the form of a thin or attenuated stream or body, and while in such condition I subject the said stream to the action of a hydrating agent, such as steam, which I find effectually slakes the lime. The steam may be introduced into the casing in any desirable way. For this purpose I have shown at opposite ends of the casing and outside of the same the vertical steam-supply pipes 11, having branches at different points in their heights leading through the end walls of the casing into the respective troughs thereof. The steam can be controlled in any desirable way and when admitted into the troughs will thoroughly and uniformly slake the lime therein, which is being mixed with the sand. The steam, however, may be introduced into the housing or casing 2 and necessarily into the troughs 3 therein in any other manner than that specifically indicated hereinbefore. After the thorough association of the sand and lime and necessarily after the latter has been effectually slaked the two ingredients are conducted to a press, and means are provided for excluding the atmosphere from the mixture before it reaches the press. I find that under certain conditions of the atmosphere after the slaked lime comes in contact with the same deleterious results are apt to follow. By virtue of my invention, however, this obstacle is overcome.

Below the lowermost trough and either inside or outside of the casing, as may be desired, I arrange a cylinder, as 13. This cylinder is shown as outside the casing and as being connected with the lowermost trough by a conduit or pipe 14 and serves to convey the mixture, of which the slaked lime is a part, directly to the press, so that the atmospheric air cannot come in direct contact with such mixture before it reaches the press. While it is not necessary, I have shown means for positively feeding the mixture along the cylinder 13 to the press, which means is represented as consisting of a spiral conveyer 15, the shaft of which may be connected, by means of cone-pulleys and belting, (denoted in a general way by 16,) with the lowermost shaft 6. By virtue of the cone-pulleys and the intermediate belt between said pulleys I can adjust the velocity of the conveyer 15. Preferably the latter is arranged to run at a higher speed than the lowermost conveyer 5 to prevent choking of the material in the cylinder 13, and to aid in securing the same result the diameter of said cylinder is greater than those of the troughs 13. The steam-pipe 11 at the right is illustrated as provided with a branch 17 opening into the cylinder 13 to introduce steam into the latter for preventing the temperature of the mixture after it leaves the lowermost trough 3 lowering before such mixture reaches the press, which is not shown.

To provide access to the interior of the housing or casing 2, I make one of the sides thereof in the form of a sliding door, by opening which any one of the troughs may be reached, or, in fact, access may be had in this way to any other of the parts inclosed by said casing. The door is shown as being of the sliding type; but this is not essential, for one of a different sort could be substituted therefor and the same object attained.

Having thus described the invention, what I claim is—

1. A mortar-mixer consisting of a casing, a plurality of troughs in the casing, arranged one above the other, each trough being adapted to deliver material into the trough below the same, spiral conveyers in the respective troughs for feeding the material therealong, the shafts of the conveyers projecting outside the casing, means outside the casing for rotatively supporting the shafts, a cylinder outside the casing, a feed device in said cylinder, a closed connection between the lowermost trough and the cylinder for securing the passage of material from the former to the latter, and steam-pipes having branches extending into the casing, and one of them being connected with said cylinder, said parts being combined substantially as described.

2. A mortar-mixer consisting of a casing, a plurality of troughs in said casing, each trough being adapted to deliver material into the trough below the same, spiral conveyers in the respective troughs for feeding the material therealong, the shafts of the conveyers projecting outside of the casing, means outside of said casing for rotatively supporting the shafts, a cylinder outside the casing, a spiral conveyer in said cylinder, mechanism for simultaneously operating the several spiral conveyers, and a steam-pipe in communication with the interior of the casing and with that of said cylinder, said parts being combined substantially as described.

In testimony whereof I have hereunto set my hand in presence of two subscribing witnesses.

EDWARD DARLING STEGER.

Witnesses:
HEATH SUTHERLAND,
GEO. W. REA.